US009258441B1

(12) United States Patent
Okada

(10) Patent No.: US 9,258,441 B1
(45) Date of Patent: Feb. 9, 2016

(54) IMAGE FORMING APPARATUS WITH MENU DISPLAY AND METHOD FOR CONTROLLING THE SAME

(71) Applicants: KABUSHIKI KAISHA TOSHIBA, Tokyo (JP); TOSHIBA TEC KABUSHIKI KAISHA, Tokyo (JP)

(72) Inventor: Yuuki Okada, Mishima Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/455,728

(22) Filed: Aug. 8, 2014

(51) Int. Cl.
*H04N 1/00* (2006.01)

(52) U.S. Cl.
CPC ....... *H04N 1/00413* (2013.01); *H04N 1/00411* (2013.01); *H04N 1/00506* (2013.01); *H04N 2201/0094* (2013.01)

(58) Field of Classification Search
CPC .......... H04N 1/00413; H04N 1/00411; H04N 1/00506; H04N 2201/0094
USPC .................................. 358/1.1–1.9, 1.11–1.18
See application file for complete search history.

(56) References Cited

U.S. PATENT DOCUMENTS

| 5,699,494 | A | * | 12/1997 | Colbert | ............... G06F 3/1293 358/1.13 |
|---|---|---|---|---|---|
| 2006/0101343 | A1 | * | 5/2006 | Machida | ........................ 715/744 |
| 2007/0212096 | A1 | | 9/2007 | Kimoto et al. | |
| 2011/0293303 | A1 | * | 12/2011 | Fujii | ............................... 399/49 |
| 2013/0265606 | A1 | * | 10/2013 | Tsuya | .................. H04N 1/0035 358/1.15 |

\* cited by examiner

*Primary Examiner* — King Poon
*Assistant Examiner* — Ibrahim Siddo
(74) *Attorney, Agent, or Firm* — Patterson & Sheridan, LLP

(57) ABSTRACT

An image forming apparatus according to an embodiment includes an input unit that receives a selection of a menu item from a plurality of menu items. A display control unit displays setting information corresponding to the selected menu item on a display unit. An image forming control unit performs image forming and processing according to the setting information when a predetermined condition is satisfied after the setting information is displayed on the display unit.

20 Claims, 6 Drawing Sheets

FIG. 3

MENU SETTING INFORMATION

| SETTING INFORMATION | | | | | | | DISPLAY EXECUTION INFORMATION | AUTOMATIC PERFORMANCE EXECUTION INFORMATION |
|---|---|---|---|---|---|---|---|---|
| SCALING | COLOR MODE | BOTH-SIDES MODE | FINISH MODE | DOCUMENT MODE | BINDING MARGIN | | | |
| 100% | FULL COLOR | ONE SIDE TO BOTH SIDES | GROUP | CHARACTER/ PHOTO | 0% | | VALID | VALID |
| ... | ... | ... | ... | ... | ... | | ... | ... |

FIG. 5

CONFIRMATION SCREEN

| | | | |
|---|---|---|---|
| SCALING | 100% DOCUMENT TO PAPER | BINDING MARGIN | ON |
| COLOR MODE | FULL COLOR | | |
| BOTH-SIDES MODE | ONE SIDE TO BOTH SIDES | | |
| FINISH MODE | GROUP | | |
| DOCUMENT MODE | CHARACTER /PHOTO | | |

CANCEL  OK

IMAGE FORMING APPARATUS WITH MENU DISPLAY AND METHOD FOR CONTROLLING THE SAME

BACKGROUND

An image forming apparatus such as a Multi Function Peripheral (MFP) is an apparatus which forms an image on a sheet such as paper. The image forming apparatus includes an input unit which receives an input for selection of a menu. When the menu is selected, an image forming apparatus in the related art sets the image forming apparatus according to setting information of an item included in the menu. Then, the image forming apparatus in the related art performs a job by pressing a start button.

However, a user may not confirm contents of a detailed item registered in the menu if each setting screen is not displayed according to an operation.

DESCRIPTION OF THE DRAWINGS

FIG. 3 illustrates an example data configuration of menu setting information stored in a storage unit, according to the embodiment.

FIG. 5 illustrates an example of a confirmation screen displayed on the display unit by a display control unit, according to the embodiment.

DETAILED DESCRIPTION

An image forming apparatus according to an embodiment includes an input unit that receives a selection of a menu item from a plurality of menu items. A display control unit displays setting information corresponding to the selected menu item on a display unit. An image forming control unit performs image forming and processing according to the setting information when a predetermined condition is satisfied after the setting information is displayed on the display unit.

Hereinafter, the image forming apparatus according to an embodiment will be described referring to drawings.

Figure 1:
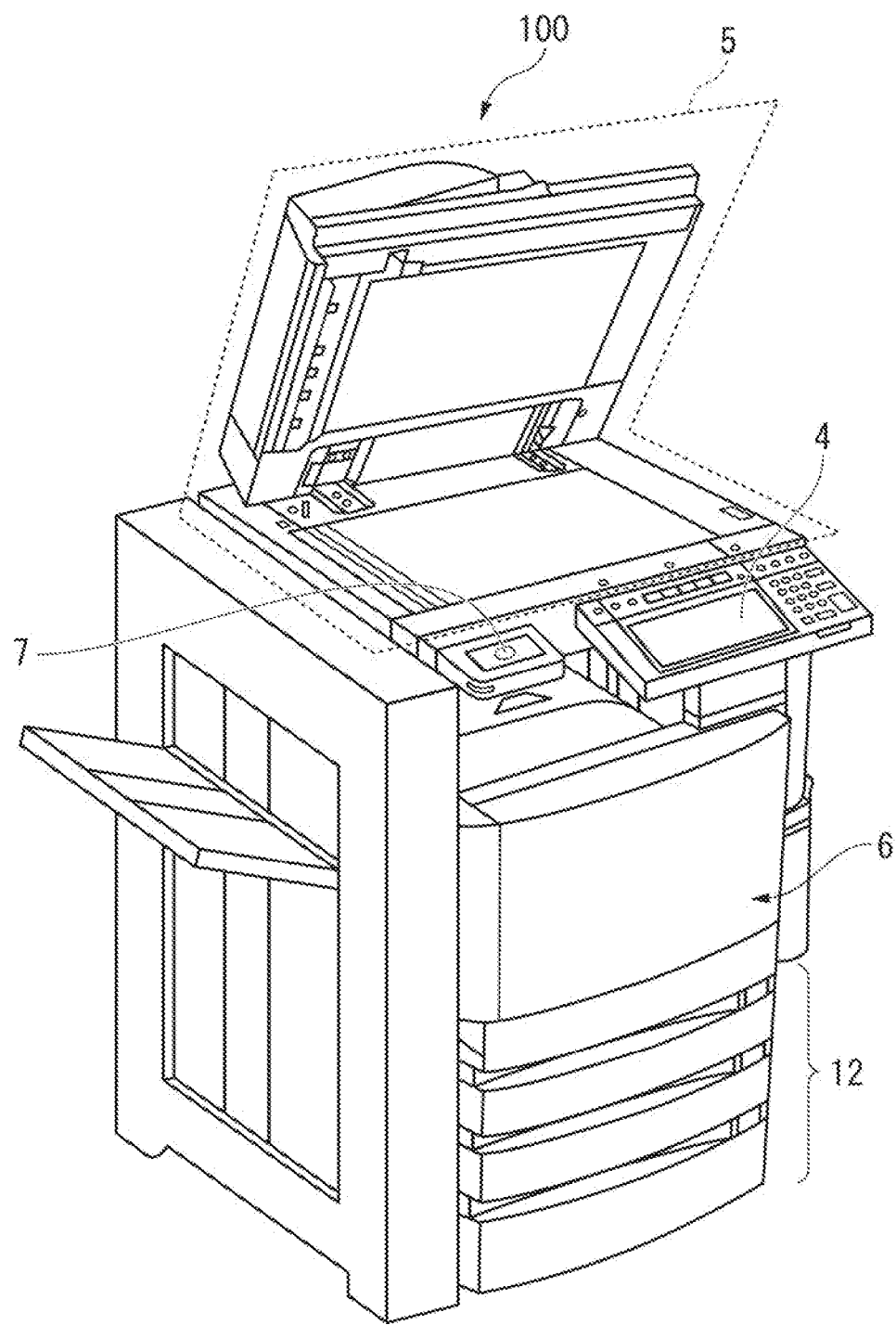
FIG. 1 is a perspective view of an image forming apparatus, according to an embodiment.

FIG. 1 is perspective view of an image forming apparatus 100 according to the embodiment. The image forming apparatus 100 may be a multifunction printer, for example. The image forming apparatus 100 generates digital data by reading a sheet.

The image forming apparatus 100 includes a reading unit 2, a display unit 4, a scanner unit 5, a printing unit 6, and a tray 12. The printing unit 6 of the image forming apparatus 100 is not limited a type which fixing a toner image, but may be an ink jet type.

Figure 2:
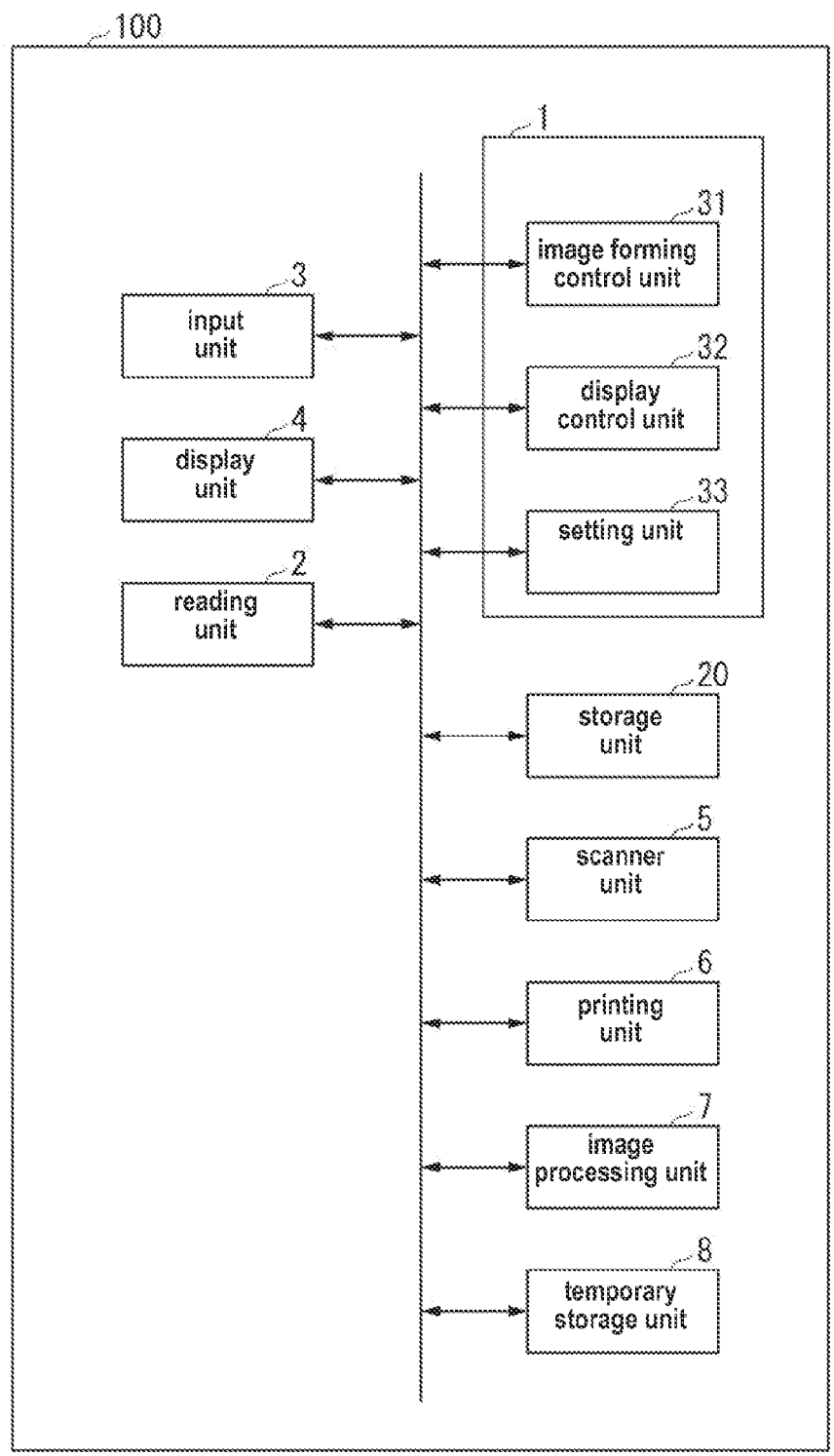
FIG. 2 is a block diagram illustrating an example configuration of the image forming apparatus, according to the embodiment.

FIG. 2 is a block diagram illustrating a functional configuration of the image forming apparatus, according to the embodiment.

The input unit 3 receives an input from a user (operator), and supplies information corresponding to the input to a CPU 1.

A display unit 4 displays information such as a menu, based on a control of the CPU 1. The display unit 4 may be implemented, for example, by a touch panel embedded liquid crystal display device.

A storage unit 20 stores menu setting information for each item of the menu. The menu setting information associates setting information, display execution information, and automatic performance execution information with each other. The setting information is detailed information of a particular item in a menu. The display execution information indicates whether or not to display the setting information on the display unit 4. The automatic performance execution information indicates whether or not to initiate automatic performance of image forming and processing. The storage unit 20 may be implemented, for example, by a semiconductor memory device.

The CPU 1 is implemented by a Central Processing Unit (CPU), a memory, and a control program. The CPU 1 is performed by reading the control program stored in the memory. Accordingly, the CPU 1 and the memory function as an image forming control unit 31, a display control unit 32, and a setting unit 33.

The image forming control unit 31 performs image forming and processing based on predetermined setting information. More specifically, the image forming control unit 31 controls an image processing unit 7 to perform processing of image data stored in a temporary storage unit 8 corresponding to the setting information and to perform image forming with the printing unit 6.

The display control unit 32 reads the display execution information, which corresponds to a designated menu received by the input unit 3, from the storage unit 20. When the display execution information indicates that setting information is to be displayed on the display unit 4, the display control unit 32 reads the setting information, which corresponds to a menu, from the storage unit 20. Then, the display control unit 32 displays the setting information as well as setting execution information. The setting execution information indicates whether or not to use the setting information that is displayed on the display unit to set the image forming control unit 31.

Based on the setting execution information, when the input unit 3 receives input of the setting information in the image forming control unit 31, further processing is performed. The setting unit reads the automatic performance execution information corresponding to a menu from the storage unit 20. Then, when the automatic performance execution information indicates that automatic performance of image forming and processing is to be initiated, the setting unit 33 applies the setting information to the image forming control unit 31. Then, the setting unit 33 causes the image forming control unit 31 to initiate image forming and processing.

FIG. 3 is an example of menu setting information stored in the storage unit 20. In FIG. 3, the menu setting information includes setting information, display execution information, and automatic performance execution information in association with each other. As illustrated in FIG. 3, the setting information includes "scaling", "color mode", "both-sides mode", "finish mode", "document mode", and "binding margin". The setting information in FIG. 3 is an example of detailed information for copying. FIG. 3 illustrates an example of menu setting information when scaling is "100%", the color mode is "full color", the both-sides mode is "one side to both-sides" (an image is formed on both-sides of a sheet from a document of one side printing), the finish mode is "group", the document mode is "character/photo", the binding margin is "ON", display execution information is "valid", and automatic performance execution information is "valid".

Figure 4:
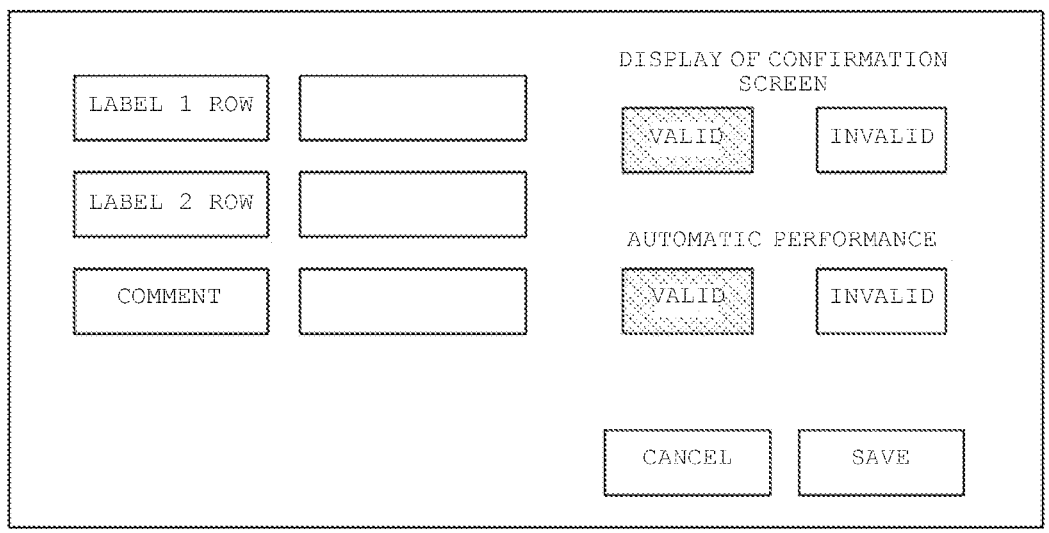
FIG. 4 illustrates an example of a menu information setting screen displayed on a display unit by a control unit when registering or editing a menu, according to the embodiment.

FIG. 4 illustrates an example menu information setting screen displayed on the display unit 4 by the CPU 1, to be used when registering or editing a menu. "Display of a confirmation screen" is selected as "valid" in FIG. 4. This indicates that the display execution information is "valid". Moreover, "Automatic performance" is selected as "valid" in FIG. 4. This indicates that the automatic performance execution information is "valid". A "save" button is pressed after a menu is registered or edited by an operation of the input unit 3. Thereby the CPU 1 causes the storage unit 20 to store menu setting information from the menu.

FIG. 5 illustrates an example confirmation screen displayed on the display unit 4 by the display control unit 32. For example, "scaling", "color mode", and "both-sides mode" are basic setting items in FIG. 5. The basic setting items are displayed on a confirmation screen all the time. In addition, "finish mode", "document mode", and "binding margin" in FIG. 5 are items registered by a user. An "OK" button and a "cancel" button are setting execution information in FIG. 5. When the button of "OK" is pressed by an operation of the input unit 3, the setting unit 33 receives an instruction to configure the image forming control unit 31 according to the setting information. Upon receiving the instruction, the setting unit 33 configures the image forming control unit 31 according to the setting information. On the other hand, when the "cancel" button is pressed by an operation of input unit 3, the setting unit 33 receives an instruction not to configure the image forming control unit 31. When receiving an instruction not to configure the image forming control unit according to the setting information, the setting unit 33 does not configure the image forming control unit 31 according to the setting information.

Figure 6:
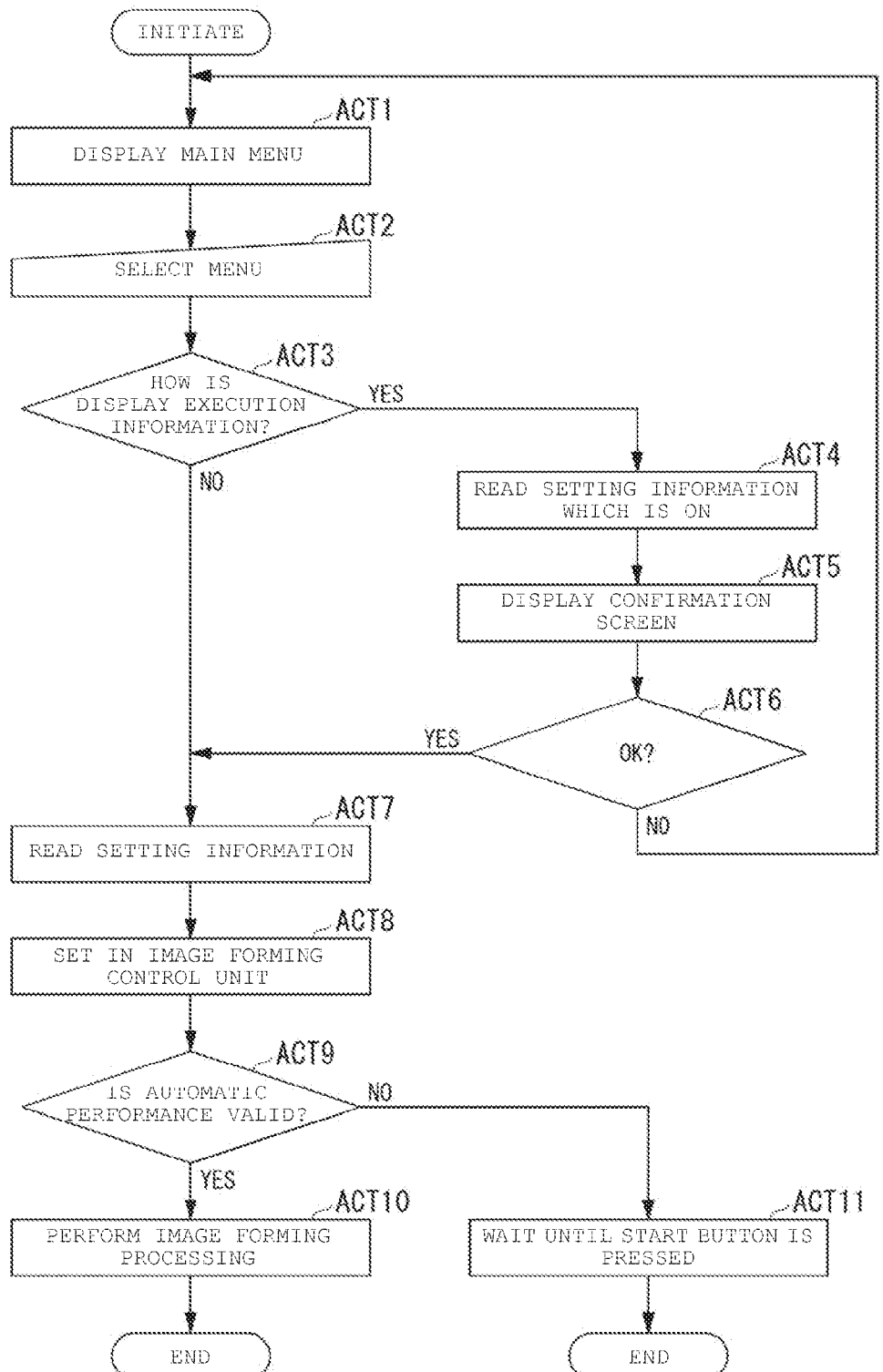
FIG. 6 is a flowchart illustrating example operations of the image forming apparatus, according to the embodiment.

FIG. 6 is a flowchart illustrating example operations of the image forming apparatus 100, according to the embodiment. First, the display control unit 32 displays a main menu (ACT1). For example, the main menu is a list of a plurality of menus. Next, a desired menu is selected by an operation of the input unit 3 by a user (ACT2).

Next, the display control unit 32 reads display execution information corresponding to the selected menu from the storage unit (ACT3). When the display execution information is valid (YES in ACT3), the display control unit 32 reads the setting information corresponding to the menu from the storage unit 20 (ACT4). Here, the setting information read by the display control unit 32 is a basic setting item and a registration item by a user. Next, the display control unit 32 displays the setting information and setting execution information (which indicates whether or not to configure the image forming control unit 31 according to the setting information) on the display unit 4 (ACT5). That is, in ACT5, the display unit 4 displays a confirmation screen. Next, when the "cancel" cancel is selected by an operation of the input unit 3 by a user (NO in ACT6), the display control unit 32 returns for the processing of ACT1. On the other hand, when the "OK" button is selected (YES in ACT6), the display control unit 32 reads the setting information corresponding to the menu from the storage unit 20 (ACTT). In addition, when the display execution information is invalid (NO in ACT3), the display control unit 32 reads setting information corresponding to a menu from the storage unit 20 (ACTT). Next, the setting unit 33 configures the image forming control unit 31 according to the setting information (ACT8).

Next, the setting unit 33 reads the automatic performance execution information corresponding to a menu from the storage unit (ACT9). When the automatic performance execution information is valid (YES in ACT9), the setting unit 33 configures the image forming control unit 31 according to the setting information. Then, the setting unit 33 initiates image forming and processing in the image forming control unit 31 (ACT10). On the other hand, when the automatic performance execution information is invalid (NO in ACT9), the setting unit 33 shifts to a state in which image forming and processing must be initiated by pressing a start button (ACT11).

As described above, the image forming apparatus according to the embodiment includes the storage unit 20. The storage unit 20 stores setting information of an item of a menu and display execution information in association with each other for each item of the menu. The display execution information is information which, before configuring the image forming control unit 31 according to the setting information, indicates whether or not to display the setting information on the display unit 4.

In addition, the image forming apparatus includes the display control unit 32 which reads display execution information corresponding to a designated menu received by the input unit 3 from the storage unit 20. When the display execution information indicates displaying the setting information on the display unit 4 before configuring the image forming apparatus, the display control unit 32 reads the setting information corresponding to the menu from the storage unit 20. Then, the display control unit 32 displays the setting information and the setting execution information (which indicates whether or not to configure the image forming control unit 31 according to the setting information) on the display unit 4.

According to the configuration, the image forming apparatus, before configuring according to setting information of a menu registered in the storage unit 20, the setting information is displayed on the display unit 4. Then, the image forming apparatus receives an instruction of whether the displayed setting contents are right or wrong. When the input unit 3 receives permission information, the setting unit 33 configures the image forming control unit 31 according to the setting information. The permission information indicates an instruction to proceed with using the setting information to configure the image forming control unit 31.

Accordingly, a user may confirm the contents of setting information before applying settings in registered setting information.

In addition, the storage unit 20 may store automatic performance execution information (which indicates whether or not to automatically initiate image forming and processing) for each menu. Moreover, when the input unit 3 receives information which indicates configuring the image forming control unit 31 according to the setting information, the setting unit 33 may be made to perform the following processing. That is, the setting unit 33 reads the automatic performance execution information corresponding to a menu from the storage unit 20. Then, when the automatic performance execution information indicates automatically initiating image forming and processing, the setting unit 33 configures the image forming control unit 31 according to the setting information. Then, the setting unit 33 causes the image forming control unit 31 to initiate the image forming and processing.

According to the configuration, when the input unit 3 receives permission information, the setting unit 33 requests automatic performance execution information. When the automatic performance execution information indicates automatically initiating image forming and processing, the setting unit 33 configures the image forming control unit 31 according to the setting information. Then, the setting unit 33 causes the image forming control unit 31 to initiate the image forming and processing.

Therefore, a user may confirm contents of the setting information before automatically forming an image, using the registered setting information.

In addition, the image forming apparatus 100 according to the embodiment includes the input unit 3 which receives a designated input. Moreover, the image forming apparatus 100 includes the display unit 4 which displays information. The image forming apparatus 100 also includes the image forming control unit 31 which performs image forming and processing based on predetermined setting information. Moreover, the image forming apparatus 100 includes the storage unit 20 which stores setting information of an item in a menu and display execution information in association with each other for each menu. The display execution information is information which, before configuring the image forming control unit 31 according to the setting information, indicates whether or not to display the setting information on the display unit 4. The image forming apparatus 100 also includes the display control unit 32. The display control unit 32 reads display execution information corresponding to a designated menu received by the input unit 3 from the storage unit 20. Then, when the display execution information indicates displaying setting information on the display unit 4 before a setting, the display control unit 32 reads the setting information corresponding to a menu from the storage unit 20. Then, the display control unit 32 displays the setting information and setting execution information (which indicates whether or not to configure the image forming control unit 31 according to the setting information) on the display unit 4. In addition, the image forming apparatus 100 includes the setting unit 33. When receiving information which indicates configuring the image forming control unit 31 from the input unit 3, the setting unit 33 configures the image forming control unit 31 according to the setting information.

The image forming control unit 31, the display control unit 32, and the setting unit 33 may be implemented as hardware.

In addition, a display of basic setting items such as "scaling", "color mode", and "both-sides mode" may be omitted and only a registration item by a user may be displayed on a confirmation screen.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   an input unit configured to receive, for a printing option listed in a menu of a plurality of printing options and having associated setting information that indicates printing modes when the printing option is selected for image formation, inputs specifying:
      display execution information that indicates, when the printing option is selected for image formation, whether to display the printing modes associated with the printing option prior to performing image formation, and
      automatic performance execution information that indicates, when the printing option is selected for image formation, whether to perform image formation prior to receiving an execution confirmation;
   a storage unit configured to store the specified display execution information and automatic performance execution information;
   a display control unit configured to display, when a user selects the printing option for image formation and when the corresponding saved display execution information is affirmative, the printing modes associated with the printing option; and
   an image forming control unit configured to perform, when a user selects the printing option for image formation and when the corresponding saved automatic performance execution information is affirmative, the image formation according to the associated setting information without waiting for the execution confirmation.

2. The apparatus according to claim 1,
   wherein, when the user selects the printing option for image formation and when the corresponding saved display execution information is negative, the display control unit does not display the printing modes associated with the printing option.

3. The apparatus according to claim 2, wherein the storage unit stores the specified display execution information individually in association with the associated setting information.

4. The apparatus according to claim 1, further comprising:
   a setting unit configured to retrieve, from the storage unit, the setting information associated with the printing option selected for image formation and to configure the image forming control unit according to the retrieved setting information.

5. The apparatus according to claim 1, wherein, when a user selects the printing option for image formation and when the corresponding saved display execution information is negative, the image forming control unit does not perform the image formation until a setting confirmation is received.

6. The apparatus according to claim 1,
   wherein, when the user selects the printing option for image formation and when the corresponding saved automatic performance execution information is negative, the image forming control unit does not perform the image formation until the execution confirmation is received.

7. The apparatus according to claim 6, wherein the storage unit stores the specified automatic performance execution information individually in association with the associated setting information.

8. A method of controlling an image forming apparatus comprising the steps of:
   receiving, for a printing option listed in a menu of a plurality of printing options and having associated setting information that indicates printing modes when the printing option is selected for image formation, inputs specifying:
      display execution information that indicates, when the printing option is selected for image formation, whether to display the printing modes associated with the printing option prior to performing image formation, and
      automatic performance execution information that indicates, when the printing option is selected for image formation, whether to perform image formation prior to receiving an execution confirmation;

storing the specified display execution information and automatic performance execution information;

displaying, when a user selects the printing option for image formation and when the corresponding saved display execution information is affirmative, the printing modes associated with the printing option and performing, when a user selects the printing option for image formation and when the corresponding saved automatic performance execution information is affirmative, the image formation according to the associated setting information without waiting for the execution confirmation.

9. The method according to claim 8, wherein, when the user selects the printing option for image formation and when the corresponding saved display execution information is negative, the setting information corresponding to the printing option is not displayed.

10. The method according to claim 9, wherein the specified display execution information is stored individually in association with the associated setting information.

11. The method according to claim 8, further comprising:

retrieving the setting information associated with the printing option selected for image formation; and configuring the image forming control unit for image formation according to the retrieved setting information.

12. The method according to claim 8, wherein, when a user selects the printing option for image formation and when the corresponding saved display execution information is negative, the image formation is not performed until a setting confirmation is received.

13. The apparatus according to claim 8, wherein, when the user selects the printing option for image formation and when the corresponding saved automatic performance execution information is negative, image formation is not performed until the execution confirmation is received.

14. The apparatus according to claim 13, wherein the specified automatic performance execution information is stored individually in association with the associated setting information.

15. A non-transitory computer readable medium that stores instructions causing an image forming apparatus to perform the steps of:

receiving, for a printing option listed in a menu of a plurality of printing options and having associated setting information that indicates printing modes when the printing option is selected for image formation, inputs specifying:

display execution information that indicates, when the printing option is selected for image formation, whether to display the printing modes associated with the printing option prior to performing image formation, and automatic performance execution information that indicates, when the printing option is selected for image formation, whether to perform image formation prior to receiving an execution confirmation;

storing the specified display execution information and automatic performance execution information;

displaying, when a user selects the printing option for image formation and when the corresponding saved display execution information is affirmative, the printing modes associated with the printing option and performing, when a user selects the printing option for image formation and when the corresponding saved automatic performance execution information is affirmative, the image formation according to the associated setting information without waiting for the execution confirmation.

16. The computer readable medium according to claim 15, wherein, when the user selects the printing option for image formation and when the corresponding saved display execution information is negative, the setting information corresponding to the printing option is not displayed.

17. The computer readable medium according to claim 16, wherein the instructions cause the specified display execution information to be stored individually in association with the associated setting information.

18. The computer readable medium according to claim 15, wherein the instructions further cause the image forming apparatus to perform the steps of:

retrieving the setting information associated with the printing option selected for image formation;

configuring the image forming control unit for image formation according to the retrieved setting information.

19. The computer readable medium according to claim 15, wherein, when a user selects the printing option for image formation and when the corresponding saved display execution information is negative, the image formation is not performed until a setting confirmation is received.

20. The computer readable medium according to claim 15, wherein, when the user selects the printing option for image formation and when the corresponding saved automatic performance execution information is negative, image formation is not performed until the execution confirmation is received.

* * * * *